(12) United States Patent
Lo et al.

(10) Patent No.: US 7,299,296 B1
(45) Date of Patent: Nov. 20, 2007

(54) FILTERING DATA FLOWS BASED ON ASSOCIATED FORWARDING TABLES

(75) Inventors: Jeffrey Y Lo, Palo Alto, CA (US); Scott Mackie, Santa Cruz, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 797 days.

(21) Appl. No.: 10/246,244

(22) Filed: Sep. 18, 2002

(51) Int. Cl.
*G06F 15/173* (2006.01)
(52) U.S. Cl. ............... 709/238; 370/231; 370/389
(58) Field of Classification Search ............... 709/238; 370/400, 231–235
See application file for complete search history.

(56) References Cited

U.S. PATENT DOCUMENTS

| | | | |
|---|---|---|---|
| 6,341,130 B1 * | 1/2002 | Lakshman et al. | 370/389 |
| 6,594,268 B1 * | 7/2003 | Aukia et al. | 370/400 |
| 6,754,729 B1 * | 6/2004 | Hass et al. | 710/14 |

OTHER PUBLICATIONS

U.S. Appl. No. 10/080,865, entitled "Distributed Filtering for Networks", filed Feb. 21, 2002, Ross Callon.
U.S. Appl. No. 10/235,455, entitled "Systems and Methods for Identifying Sources of Network Attacks", filed Sep. 5, 2002, Ben Eater, Rob Jaeger.

\* cited by examiner

*Primary Examiner*—Yves Dalencourt
(74) *Attorney, Agent, or Firm*—Shumaker & Sieffert, P.A.

(57) ABSTRACT

Techniques are described for selectively filtering data, such as network packets, that correspond to forwarding tables. For example, a router receives packets from an input interface of an interface card (IFC). The router applies one or more input interface filters associated with the input interface that received the packet. The router selectively associates the packet with a forwarding table, applies a corresponding forwarding filter, and determines the output interface corresponding to the next hop of the packet. The router may further apply one or more output interface filters associated with the output interface, and forwards the packet in accordance with the respective forwarding information.

22 Claims, 5 Drawing Sheets

FILTERING DATA FLOWS BASED ON ASSOCIATED FORWARDING TABLES

TECHNICAL FIELD

The invention relates to computer networks and, more particularly, to techniques for filtering data within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Conventional routers often maintain the forwarding information in the form of one or more forwarding tables. Upon receiving an incoming packet, the router examines information within the packet to identify the destination for the packet. Based on the destination, the router forwards the packet in accordance with one of the forwarding tables.

The routers may further apply packet filters to packet flows through the routers. For example, the router may compare header information within the packet to a set of filtering rules, sometimes referred to as "terms". The filtering rules may specify, for example, particular source IP address, destination IP addresses, and other criteria for filtering packets. Specifically, the router identify packets from the packet flows that match the filtering rules, and perform an associated action on the packet depending on which filtering rule the packet matched. The action may include dropping the packet, remarking the packet as lower priority, counting packets that match the filtering rule, and the like. For example, the router drop packets having a source IP address of a device sourcing a denial of service (DoS) attack by applying a filtering rule for the source IP address dropping any packets matching the filter rule Conventional routers typically apply the filters to packet flows based on the interfaces from with the flows are received, i.e., on an interface-by-interface basis. For instance, the router may apply an interface-specific filter to each of the packet flows received by a given interface. Alternatively, the routers may apply a single packet filter to all packet flows regardless of the interface from which the packet.

SUMMARY

In general, the invention is directed to techniques for selectively applying filters to packets depending on the forwarding tables used by the router to forward the packets. A router, for example, may receive packets from multiple customer site networks via multiple interfaces, and apply a "forwarding filter" to the packets. Accordingly, as referred to herein, a forwarding filter refers to a filter applied by the router to packet flows that are forwarded to the network in accordance with a forwarding table.

More specifically, the router maintains a set of forwarding filters, and may associate each filter with a forwarding table. The router applies the forwarding filter to compare, for example, header information of packets with a set of defined filtering rules. When a packet matches one of the filtering rules, the router performs an associated action to the matching packet. The action associated with the filtering rule, sometimes referred to as an "action modifier", may include dropping the packet, counting the packet in order to maintain traffic statistics, sampling the traffic for traffic profiling, remarking the packet with a lower priority, and relaying the packet to an alternate forwarding table. When a packet does not match any of the filtering rules, the router forwards the packet to a public network in accordance with the respective forwarding table. In this manner, the router may filter the packet flows of multiple customer site networks, for example, with a common forwarding filter.

The router may support multi-level filtering in that, in addition to application of the forwarding filters, the router may apply input and output interface filters to the packets. For example, the router may apply a first input interface filter to a packet flow received from a first interface, and a second input interface filter to a packet flow received from a second interface. The router may then apply a common forwarding filter to the packet flows, and may also apply one or more output interface filters to the packet flows before forwarding the packets via output interfaces.

In one embodiment, a method comprises receiving a data unit. The method further comprises identifying a forwarding table based on the data unit. The method also includes selectively applying a forwarding filter to the data unit based on the identified forwarding table.

In another embodiment, a network device comprises an input interface. The network device further comprises a forwarding table corresponding to the input interface. The network device also includes a forwarding filter associated with the forwarding table to filter the data unit received from the corresponding input interface for the forwarding table.

In another embodiment, a computer-readable medium comprises a forwarding table to control a forwarding engine of a network device. The computer-readable medium further comprises a forwarding filter associated with the forwarding table to filter data units received by the network device.

In another embodiment, a method comprises forwarding a data unit in accordance with a forwarding table. The method further comprises filtering the data unit with a forwarding filter based on the forwarding table.

In another embodiment, a computer-readable medium comprises instructions that cause a processor to receive a data unit, and identify a forwarding table based on the data unit. The computer-readable medium further comprises instructions that cause the processor to filter the data unit with a forwarding filter associated with the forwarding table.

In another embodiment, a network device comprises a forwarding table having respective a forwarding filter. The network device further comprises a control unit to receive a data unit and forward the data unit in accordance with the forwarding table, wherein the control unit applies the forwarding filter to the data unit based on the forwarding table.

The invention may provide one or more advantages. The described techniques may, for example, simplify the management of packet filters within a router. An administrator may configure the forwarding filters of the router to include filtering rules that are common to the packet flows of a corresponding forwarding table. When new filtering rules must be applied to the packet flows, the administrator may update the common forwarding filter as opposed to individually updating each of the interface filters associated with each of the packet flows. The described techniques may further allow for instantiation and destruction of interfaces without monitoring and adding interface filters. For instance, the router may instantiate a logical interface, and filter packet flows of the instantiated logical interface with an associated forwarding filter.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
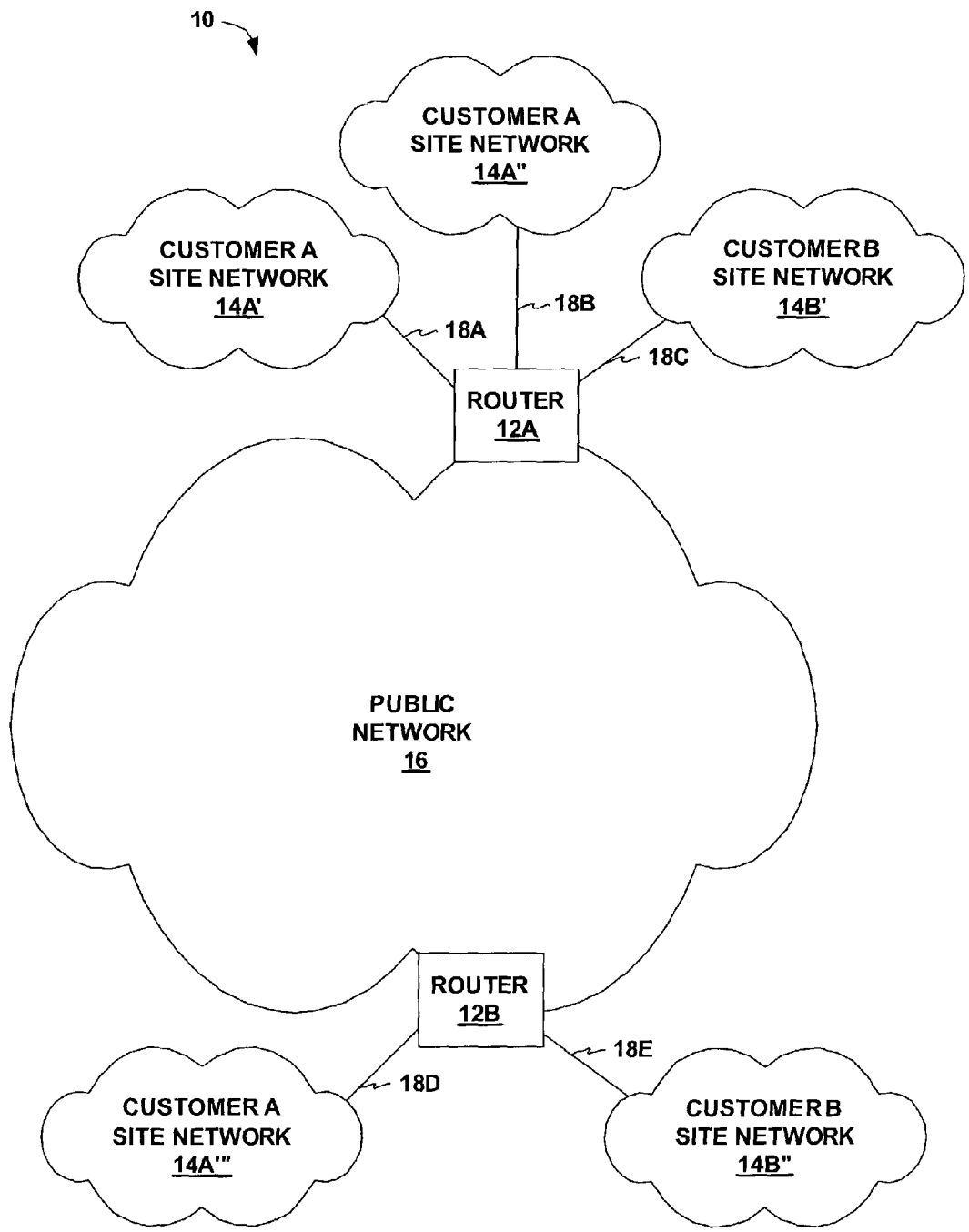
FIG. 1 is a block diagram illustrating an example system in which routers filter packet flows associated with forwarding tables in accordance with the principles of the invention.

FIG. 1 is a block diagram illustrating an example system 10 comprising routers 12A-12B ("routers 12") that filter packet flows associated with forwarding tables in accordance with the principles of the invention. Routers 12 couple customer site networks 14A-14B ("customer site networks 14") to a public network 16. Public network 16 includes one or more autonomous systems (not shown) having a number of devices, such as routers and switches, used to forward packets across public network 16.

Customer site networks 14 may be geographically distributed sites of multiple customers. In the example of FIG. 1, customer site networks 14 include customer site networks for two customers: customer A and customer B. For example, customer A includes customer site networks 14A', 14A", and 14A'''. Each of customer site networks 14 includes one or more devices (not shown), such as personal computers, laptop computers, handheld computers, workstations, servers, routers, switches, printers, fax machines, or the like. Customer site networks 14 may include one or more Local Area Networks (LANs), Wide Area Network (WANs), or the like. Although system 10 may include any number of customer site networks 14 coupled to public network 16 by any number of routers 12, FIG. 1, for simplicity, shows only customer site networks 14 coupled to public network 16 by routers 12. Each of customer site networks 14 connects to routers 12 via one or more access links 18A-E ("access links 18").

Customer site networks 14 may communicate with remote network devices within public network 16. Further, customer site networks 14 may securely transmit packet flows between associated customers site networks 14 via corresponding virtual private networks (not shown). For example, customer A may securely transmit packet flows between customer site network 14A', customer site network 14A", and customer site network 14A''' via an associated VPN and routers 12.

In general, routers 12 filter packet flows transmitted between customer site networks 14 and public network 16 in accordance with the invention. More specifically, routers 12 filter the packet flows based on forwarding tables used by routers 12 to forward the packet flows across public network 16. Accordingly, as referred to herein, a "forwarding filter" refers to a filter applied by routers 12 to packet flows that are forwarded to public network 16 in accordance with a forwarding table.

More specifically, using router 12A as an example, router 12A maintains a set of forwarding filters, and may associate the forwarding filters with a forwarding table. Router 12A applies the forwarding filters to compare, for example, header information of the packets to a set of forwarding rules of the forwarding filter. When a packet of a packet flow matches one of the filtering rules, router 12A performs an associated action on the matching packet. The action associated with the filtering rule, sometimes referred to as an "action modifier", may include dropping the packet, counting the packet in order to maintain traffic statistics, sampling the traffic for traffic profiling, remarking the packet with a lower priority, and relaying the packet to an alternate forwarding table. When a packet of a packet flow does not match any of the filtering rules, router 12A forwards the packet to public network 16 in accordance with the respective forwarding table. For example, router 12A may apply a forwarding filter to reduce the volume of traffic through router 12A. Router 12A may apply a forwarding filter that has filtering rules and associated actions that discard packets with a low priority, while not affecting packets with a high priority. By applying the forwarding filter, the volume of traffic through router 12A may decrease while high priority packets continue to be forwarded.

Router 12A may support multi-level filtering in that, in addition to application of the forwarding filters, router 12A may apply input and output interface filters to the packets. For example, router 12A may apply a first input interface filter to a packet flow received from a first interface, and a second input interface filter to a packet flow received from a second interface. Router 12A may then apply a common forwarding filter to the packet flows, and may also apply one or more output interface filters to the packet flows before forwarding the packets via output interfaces.

Figure 2:
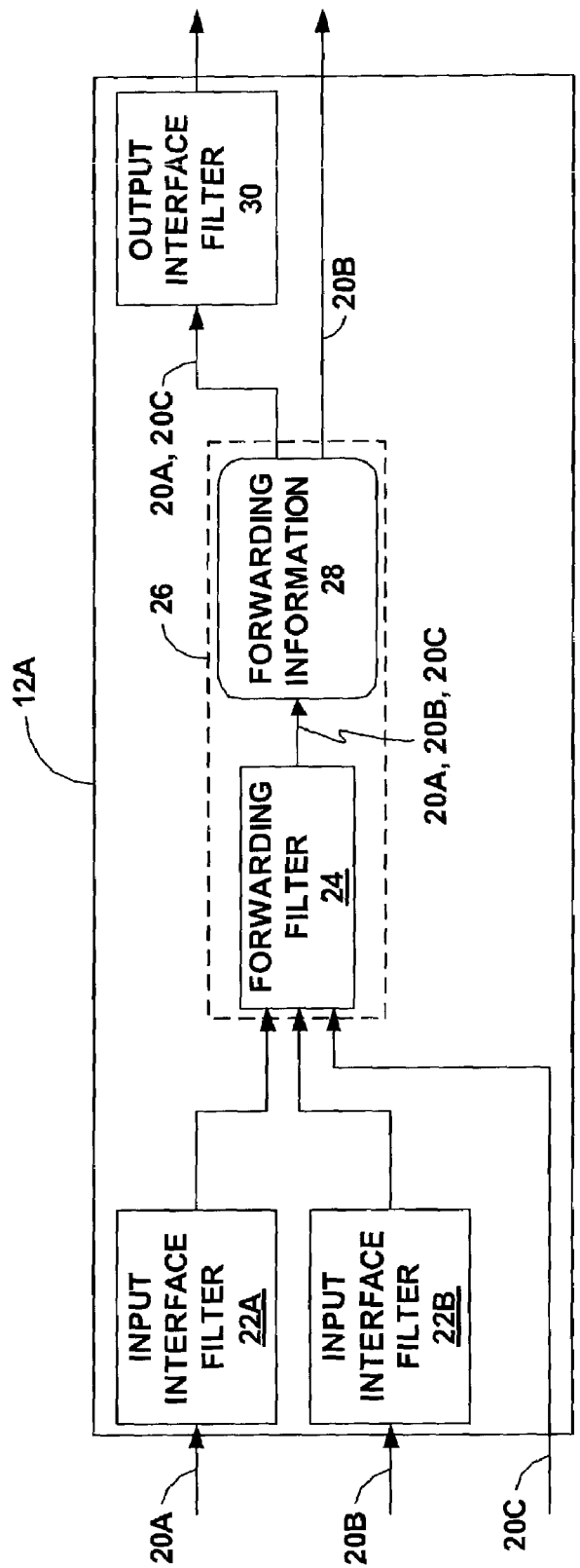
FIG. 2 is a block diagram illustrating the flow of packets through a router in accordance with the principles of the invention.

FIG. 2 is a block diagram illustrating the flow of packets through one of routers 12, such as router 12A. Router 12A receives packet flows 20A-20C ("packet flows 20"), and selectively applies input interface filters 22A-22B ("interface filters 22") to packet flows 20. In the illustrated example of FIG. 2, router 12A applies input interface filter 22A to packet flow 20A and input interface filter 22B to packet flow 20B. Router 12A does not apply an input interface filter 22 to packet flow 20C. Input interface filters 22 may include, for example, interface-specific filtering rules and associated actions, which router 12A may apply to packet flows 20.

Router 12A applies a forwarding filter 24 to packet flows 20 based on a forwarding table 26 used by router 12A to forward the packets. Forwarding filter 24 includes forwarding table-specific filtering rules and associated actions that are applied to packet flows 20. In this manner, router 12A filters packets of packet flows 20 that correspond to forwarding table 26 with common forwarding rules.

Router 12A determines a next hop for packets of packet flows 20 from forwarding information 28, which may associate network destinations with specific next hops. Router 12A selectively applies an output interface filter 30 to packet flows 20. For instance, router 12A may apply an output interface filter 30 to packet flows destined for a particular next hop. In the example of FIG. 2, router 12A applies output interface filter 30 to packet flows 20A and 20C, and does not apply an output interface filter 30 to packet flow 20B. Although router 12A may include any number input interfaces 22 and output interfaces 30 associated with any number of forwarding tables 26, FIG. 1, for simplicity, shows only input interfaces 22 and output interface 30 associated with forwarding table 26.

Figure 3:
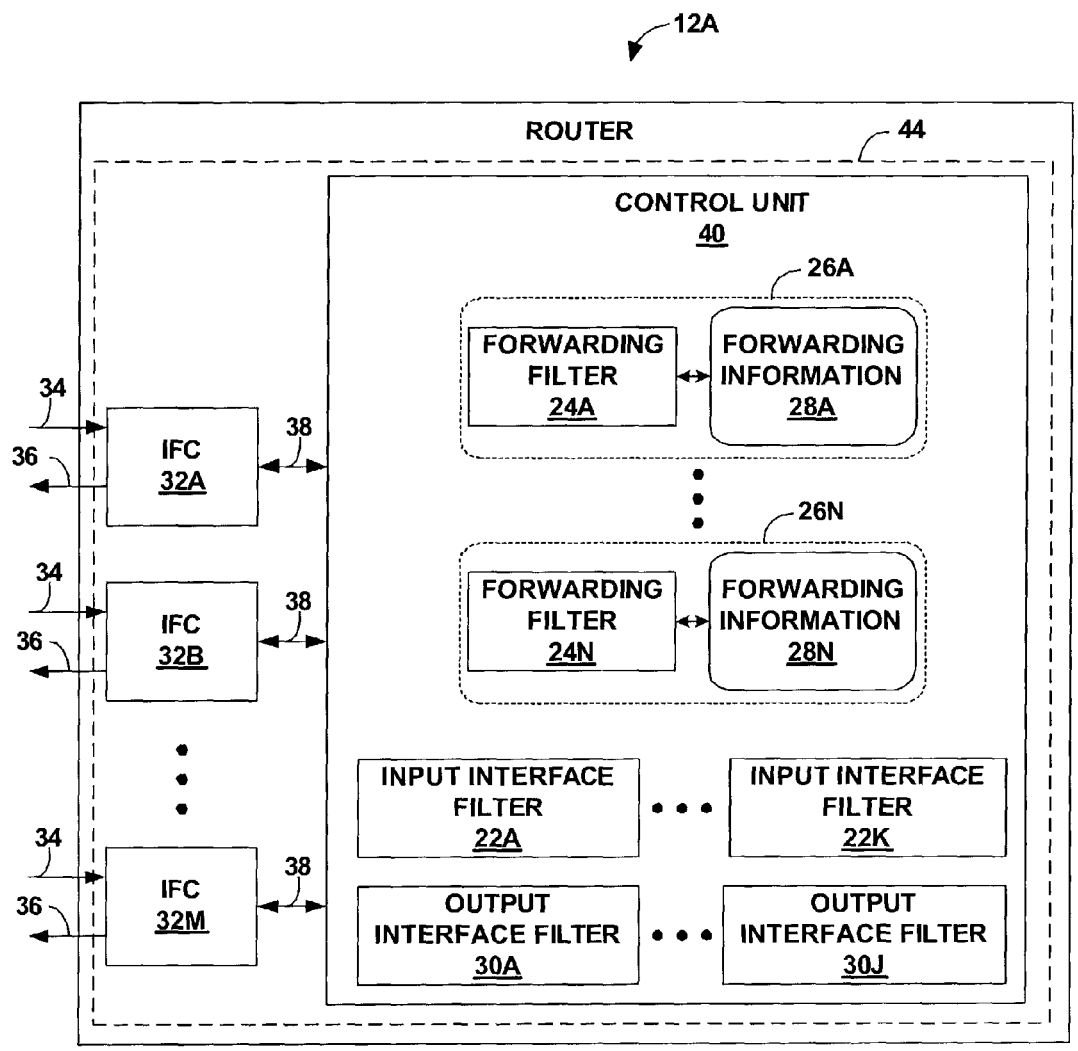
FIG. 3 is a block diagram illustrating an exemplary router that filters packet flows associated with forwarding tables in accordance with the principles of the invention.

FIG. 3 is a block diagram illustrating an exemplary embodiment of router 12A that filters packets in accordance with the principles of the invention. In particular, router 12A selectively filters packet flows based on a respective one of forwarding tables 26A-26N ("forwarding tables 26") that forwards the packet flows across public network 16.

Router 12A includes interface cards 32A-32M ("IFCs 32") that receive and send packet flows via network links 34 and 36, respectively. IFCs 32 are typically coupled to network links 34, 36 via a number of interface ports. An interface 38 may couple each of IFCs 32 to a control unit 40. Each of interfaces 38 may correspond to one or more physical or logical interfaces. Each physical or logical interface may correspond to one or more packet flows.

Control unit 40 maintains forwarding tables 26 that include forwarding information 28A-28N ("forwarding information 28"). Forwarding information 28 may associate, for example, network destinations with specific next hops and corresponding IFCs 32. Control unit 40 may, for example, maintain a separate forwarding table 26 corresponding with different VPNs of different customers. Forwarding tables 26 may further include forwarding filters 24A-24N ("forwarding filters 24"). Forwarding tables 26 need not be tables. For example, forwarding tables 26 may be link lists, radix trees, databases, flat files, or any other data structures. Although in the example shown in FIG. 3 all of forwarding tables 26 include a corresponding forwarding filters 24, this need not be the case. For instance, router 12A may forward packet flows across public network 16 without applying one of forwarding filters 24.

Control unit 34 may also maintain input interface filters 22A-22K ("input interface filters 22"), and output interface filters 30A-30J ("output interface filters 30"). Interface filters 22 and 30 include interface-specific filtering rules applied to packet flows. Interface filters 22 and 30 may correspond to logical interfaces and/or physical interfaces between control unit 40 and IFCs 32. Interface filters 22 and 30 may further correspond to individual packet flows.

Router 12A may further include a chassis 44 for housing control unit 40. Chassis 44 has a number of slots (not shown) for receiving a set of cards, including IFCs 32. Each card may be inserted into a corresponding slot of chassis 44 for electrically coupling the card to control unit 40 via a bus, backplane, or other electrical communication mechanism.

One of IFCs 32 receives a packet of a packet flow via a respective inbound network link 34, and relays the packet to control unit 40 via interface 38. IFCs 32 may receive the packet from one of customer site networks 14 or from public network 16. Control unit 40 receives the packet from a respective one of IFCs 32, and selectively applies input interface filters 22 to the packet. For instance, control unit 40 may apply one or more input interface filters 22 that correspond to the interface of IFCs 32 that received the packet. Control unit 40 may, alternatively, apply input interface filters 22 based on the particular packet flow of the packet.

Control unit 40 further associates the packet with one of forwarding tables 26. For example, control unit 40 may identify which interface of a respective one of IFCs 32 received the packet, and associate the packet with one of forwarding tables 26 based on the interface of IFC 32 that received the packet. Alternatively, control unit 40 may associate the packet with one of the forwarding tables 26 based on the packet flow to which the packet belongs. Control unit 40 may apply forwarding filters 24 associated with forwarding tables 26 to the packet. In this manner, router 12A filters packets of packet flows that correspond to a particular one of forwarding tables 26 with one of forwarding filters 24.

Control unit 40 further identifies the next hop of the packet from forwarding information 28 of forwarding tables 26, and selectively filters the packet based on the identified next hop. For example, the next hop may correspond with an output interface of one of IFCs 32 corresponding to one of customer site networks 14. The output interface of IFCs 32 corresponding to the next hop of the packet may be associated with one or more of output interface filters 225. Control unit 40 applies output interface filters 2230 associated with the output interface corresponding to the next hop, and forwards the packet to the next hop in accordance with forwarding information 28.

IFCs 32 may apply interface filters 22 and 30 instead of control unit 40. For example, IFCs 32 may each maintain one or more interface filters 22 and 30, or may access interface filters 22 and 30 stored in control unit 40, and apply one or more of interface filters 22 and 30 to the packet flows through IFCs 32.

Router 12A may further dynamically instantiate logical interfaces between control unit 40 and IFCs 32, and associate the instantiated logical interfaces with a respective one of forwarding tables 26. Router 12A filters the packet flows of the instantiated logical interfaces with forwarding filters 24 associated with forwarding tables 26. In this manner, associating the dynamically instantiated logical interfaces with respective forwarding tables 26 and, in turn, forwarding filters 24 allows for instantiation and destruction of interfaces without monitoring and adding interface filters 22 and 30.

Router 12A may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of router 12A may be implemented by executing the instructions of the computer-readable medium with one or more processors, discrete hardware circuitry, firmware, software executing on a programmable processor, or a combination of any of the above.

Figure 4:
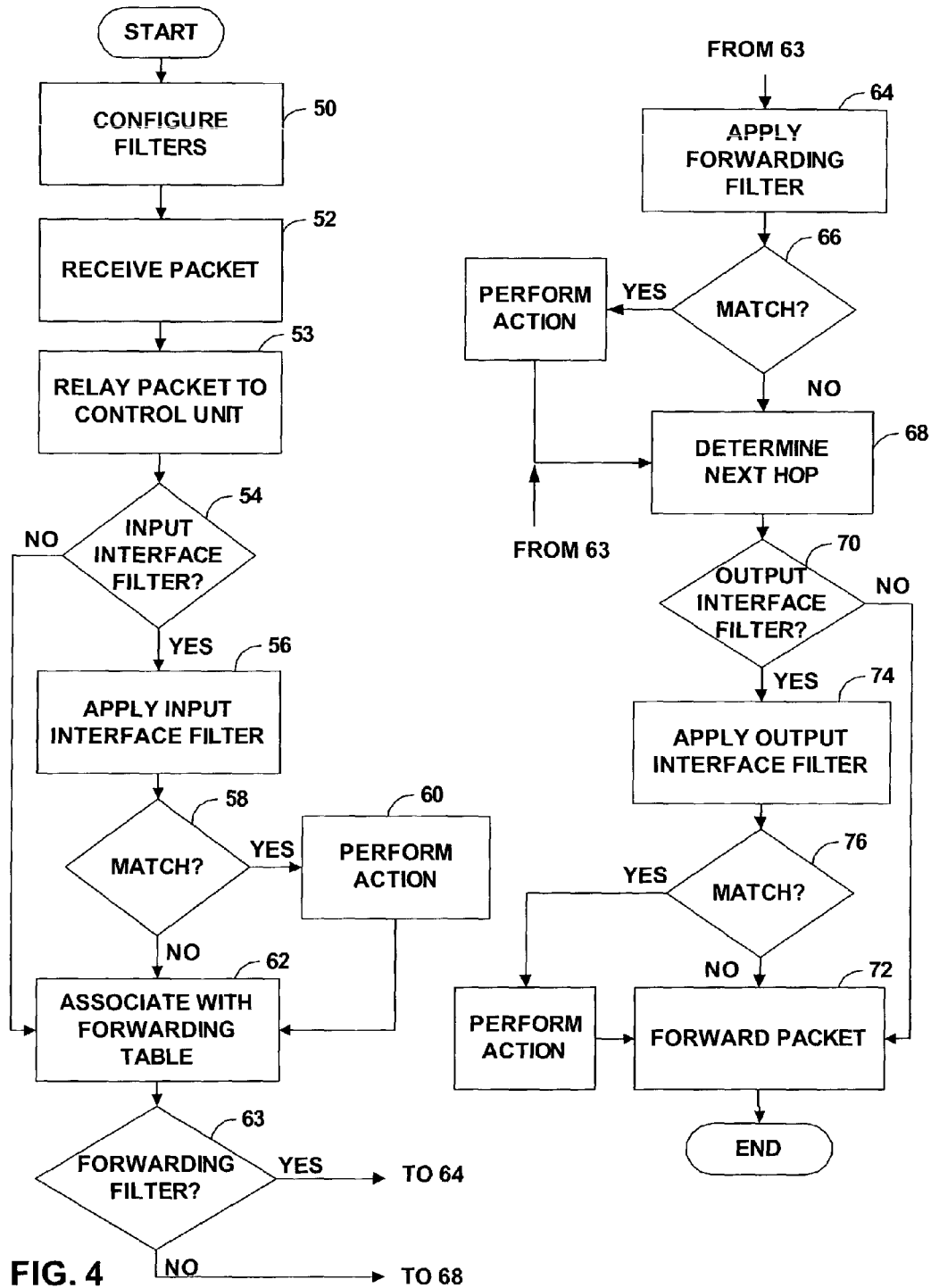
FIG. 4 is a flow diagram illustrating an example method employed by a router to filter packet flows associated with forwarding tables.

FIG. 4 is a flow diagram illustrating an example method employed by one of routers 12, such as router 12A, to filter packets in accordance with the principles of the invention. A client, such as a human user or an automated script application, configures input interface filters 22, output interface filters 30 and forwarding filters 24 (50). For example, the client may configure forwarding filters 24 of router 12A to filter certain network traffic as a matter of customer policy, and may configure interface filters 22 and 30 to limit the amount of bandwidth customers may use.

Router 12A receives a packet of a packet flow via one of IFCs 32, and relays the packet to control unit 40 (52, 53). Control unit 40 determines whether any of input interface filters 22 correspond to the packet flow to which the packet belongs (54). For example, control unit 40 may maintain a mapping that associates packet flows with respective input interface filters 22. When at least one of input interface filters 22 corresponds to the packet flow, control unit 40 applies the corresponding one or more of input interface filters 22 to the packet (56). Control unit 40 compares packets of packet flows with filtering rules of the corresponding input interface filters 22 (58). For example, control unit 40 may compare header information of the packets, such as source IP address, destination IP address, port number, and protocol type, with the filtering rules to identify matches. Alternatively, router 12A may compare information within the packet, e.g., within the payload of the packet, with the filtering rules to identify matches. When control unit 40 finds a match between the packet information and one of the filtering rules of input interface filters 22, control unit 40 performs an associated action to the packet (60). Control unit 40 may, for example, increment a packet counter to maintain traffic statistics for a particular forwarding table. Alternatively, control unit 40 may discard the packet and notify the sending device that the packet was undeliverable, or discard the packet without notifying the sending device.

When none of filtering rules of input interface filters 22 matches the packet information, control unit 40 associates the packet with one of forwarding tables 26 (62). For instance, control unit 40 may maintain a mapping that associates packet flows with forwarding tables 26. Control unit 40 determines whether one of forwarding tables 26 that forwards the packet includes associated forwarding filters 24 (63). When one or more forwarding filters 24 are associated with the forwarding tables 26, control unit 40 applies one or more forwarding filters 24 associated with forwarding tables 26 to the packet (64). Forwarding filters 24 includes filtering rules that control unit 40 compares with packet information, such as header information of the packets (66). When one of forwarding filters 24 identifies a match between the filtering rules and the packet information, control unit 40 performs an associated action on the packet (60).

When forwarding filter 24 does not find a match between any of the filtering rules and the packet information or when none of forwarding filters 24 are associated with forwarding tables 26, control unit 40 determines the next hop of the packet from forwarding information 28 of the associated forwarding table 26 (68). The output interface may be a physical or logical interface of one of IFCs 32. Control unit 40 further determines whether any of output interface filters 30 correspond to the determined next hop or associated output interface (70). When none of output interface filters 22 correspond to the next hop or associated output interface, control unit 40 forwards the packet in accordance with forwarding information 28 associated with forwarding tables 26 (72).

When one of output interface filters 30 corresponds to the output interface, control unit 40 applies the corresponding output interface filter 30 to the packet to identify any matches between the filtering rules of corresponding output interface filters 30 and packet information (74, 76). When control unit 40 identifies a match, control unit 40 performs an associated action on the packet (60). When control unit 40 does not identify a match, control unit 40 forwards the packet in accordance with forwarding information 28 associated with forwarding table 26 (72).

Figure 5:
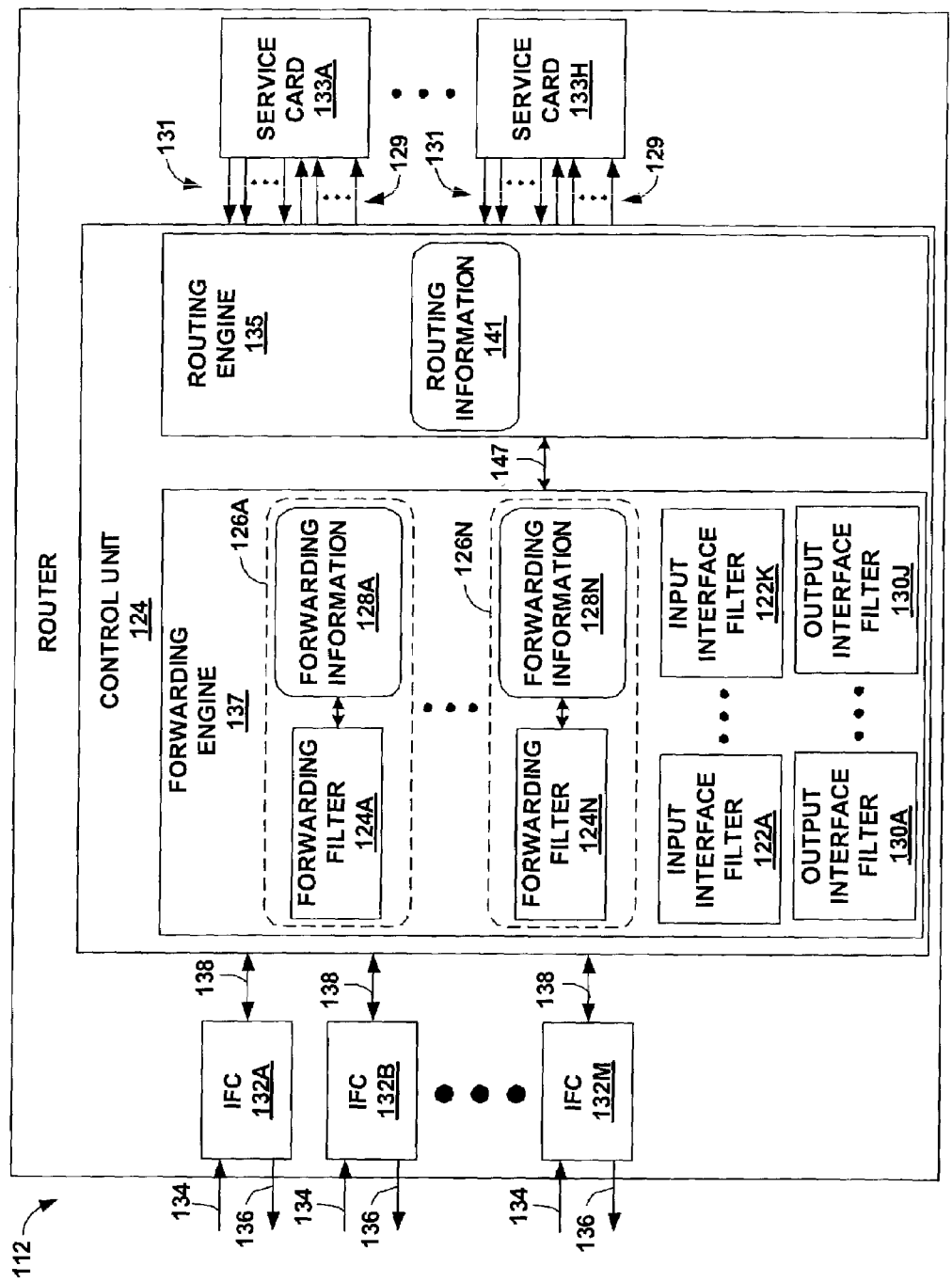
FIG. 5 is a block diagram illustrating another exemplary router that filters packet flows associated with forwarding tables.

FIG. 5 is a block diagram illustrating another exemplary router 112 that filters packet flows in accordance with the principles of the invention. Router 112 includes interface cards 132A-132M ("IFCs 132") that receive and send packet flows via network links 134 and 136, respectively. An interface 138 may couple each of IFCs 132 to a control unit 140. In addition, router 112 may include service cards 133A-133H ("service cards 133") that provide services to packet flows through router 112. A number of input logical interfaces 129 and output logical interfaces 131 may couple service cards 133 to control unit 140.

Control unit 140 comprises a routing engine 135 and at least one forwarding engine 137. Routing engine 135 is primarily responsible for maintaining routing information 141, which describes the topology of a network. In particular, routing information 141 describes various routes within the network, and the appropriate next hops for each route, i.e., the neighboring devices of router 112 along each of the routes. Routing engine 135 periodically updates routing information 141 to accurately reflect the network topology.

Routing engine 135 analyzes routing information 141 and generates forwarding tables 126A-126N ("forwarding tables 126") for forwarding engine 137. Forwarding tables 126 each include associated forwarding information 128. Forwarding tables 126 may also include an associated forwarding filter 124. Forwarding engine 137 further includes input interface filters 122A-122K ("input interface filters 122") and output interface filters 130A-130J ("output interface filters 130").

As described in detail above, control unit 140 receives packet flows from an input interface of one of IFCs 132 or service cards 133. Control unit 140 may apply one or more of input interface filters 122 associated with the input interface that received the packet. Control unit 140 selectively associates the packet with one of forwarding tables 126, applies the corresponding forwarding filter 124, and determines the next hop. Control unit 140 may apply output interface filters 130 associated with the next hop, or the output interface corresponding to the next hop. Control unit 134 forwards the packet in accordance with forwarding information 128 of the respective forwarding table 126.

In one embodiment, each of routing engine 135 and forwarding engine 137 may comprise one or more dedicated processors, hardware, and the like, and may be communicatively coupled by a data communication channel 147. Data communication channel 147 may be a high-speed network connection, bus, shared-memory or other data communication mechanism. Routing engine 135, forwarding engine 137, or both, may make use of the data structures and organization described above.

Various embodiments of the invention have been described. Although the embodiments have been described in terms of packet-based systems and methods, any data units may be used without departing from the principles of the invention. For example, the principles of the invention may be readily applied to a variety of protocols, such as the Transmission Control Protocol (TCP), the User Datagram Protocol (UDP), the Internet Protocol (IP), Asynchronous Transfer Mode (ATM), Frame Relay, and the like. Accordingly, "packet" is used to encompass any such unit of data, and may be interchanged with the term "cell," or other similar terms used in such protocols to describe a unit of data communicated between resources within the network. These and other embodiments are within the scope of the following claims.

The invention claimed is:

1. A method of forwarding packets using a router having a plurality of input interfaces coupled to a centralized control unit, the method comprising:
   maintaining, within the control unit, a plurality of forwarding tables that each associate a plurality of network destinations with next hops in a network;
   maintaining, within the control unit, a plurality of sets of forwarding filters, wherein each of the sets of forwarding filters corresponds to a different one of the plurality of forwarding tables, and wherein each of the forwarding filters include at least one forwarding rule and an associated action;
   receiving, with one of the plurality of input interfaces, a data unit from the network;
   forwarding the data unit from the input interface that received the packet to the control unit;
   selecting, with the control unit, one of the plurality of forwarding tables to be used by the control unit to forward the packet;
   selectively applying to the data unit only the forwarding rules and associated actions of the forwarding filters of the set of forwarding filters that corresponds to the selected forwarding table; and
   forwarding the data unit with the control unit to an output interface in accordance with the selected one of the plurality of forwarding tables maintained by the control unit.

2. The method of claim 1, wherein one or more of the plurality of forwarding tables corresponds to more than one of the plurality of input interfaces.

3. The method of claim 1, further comprising:
   identifying the output interface for the data unit based on the selected forwarding table; and
   applying an output interface filter to the data unit based on the identified output interface.

4. The method of claim 1, further comprising:
   dynamically instantiating a logical interface between the input interface that received the data unit and the control unit;
   associating the instantiated interface with a first forwarding table of the plurality of forwarding tables; and
   filtering the data unit of the instantiated interface with a forwarding filter associated with the first forwarding table.

5. The method of claim 1, wherein selectively applying the forwarding filters comprises:
   accepting the data unit based on an examination of header information; and
   forwarding the accepted data unit.

6. The method of claim 1, wherein selectively applying the forwarding filters comprises:
   rejecting the data unit based on an examination of header information; and
   discarding the rejected data unit.

7. The method of claim 1, wherein each of the plurality of forwarding tables maintained by the control unit corresponds to one of a plurality of different customer virtual private networks (VPNs).

8. The method of claim 1, wherein selecting one of the plurality of forwarding tables comprises selecting one of the plurality of forwarding tables based on the data unit.

9. The method of claim 1, wherein selecting one of the plurality of forwarding tables comprises selecting one of the plurality of forwarding tables based on the input interface that received the data unit from the network.

10. A network device comprising:
    a plurality of input interfaces that receive at least one data unit from a network; and
    a control unit coupled to the input interfaces, wherein the control unit includes:
      a plurality of forwarding tables that each associate a plurality of network destinations with specific next hops in a network;
      a plurality of sets of forwarding filters, each of the sets of forwarding filters being associated with a different one of the forwarding tables, and each of the forwarding filters including at least one forwarding rule and an associated action; and
    wherein the control unit receives the data unit from the one of the input interfaces that received the data unit from the network, selects one of the plurality of forwarding tables to forward the data unit, selectively applies the forwarding filters to the data unit by applying only the forwarding rules and associated actions of the set of forwarding filters associated with the selected forwarding table, and forwards the data unit to an output interface in accordance with the selected one of the plurality of forwarding tables maintained by the control unit.

11. The network device of claim 10, further comprising a set of interface filters, wherein each of the set of interface filters filters packets for a respective one of the plurality of input interfaces.

12. The network device of claim 10, further comprising:
    an output interface; and
    an interface filter that filters data units of the output interface.

13. The network device of claim 12, further comprising:
    an interface card; and,
    a service card,
    wherein the interface card and the service card each provide a number of input interfaces and a number of output interfaces.

14. The network device of claim 13, further comprising a chassis having slots to receive and couple the interface card and the service card to the control unit.

15. The network device of claim 10, wherein each of the plurality of forwarding tables may be one or more of a list, radix tree, database, flat file, and table.

16. The network device of claim 10, wherein each of the plurality of forwarding tables maintained by the control unit corresponds to one of a plurality of different customer virtual private networks (VPNs).

17. A computer-readable storage medium comprising instructions that cause a processor to:
    maintain, within a centralized control unit of a router, a plurality of forwarding tables that each associate a plurality of network destinations with next hops in a network;
    maintain, within the control unit, a plurality of sets of forwarding filters, wherein each of the sets of forwarding filters corresponds to a different one of the plurality of forwarding tables, and wherein each of the forwarding filters include at least one forwarding rule and an associated action;
    receive, with one of a plurality of input interfaces coupled to the control unit, a data unit from the network;
    forward the data unit from the input interface that received the packet to the control unit;
    select, with the control unit, one of the plurality of forwarding tables to be used by the control unit to forward the packet selectively apply to the data unit only the forwarding filters rules and associated actions of the forwarding filters of the set of forwarding filters that corresponds to the selected-forwarding table; and forward the data unit with the control unit to an output interface in accordance with the selected one of the plurality of forwarding tables maintained by the control unit.

18. The computer-readable medium of claim 17, further comprising instructions that cause the processor to filter the data unit with an interface filter corresponding to the input interface that received the data unit.

19. The computer-readable medium of claim 17, further comprising instructions that cause the processor to:

identify an output interface for the data unit based on the identified forwarding table;

filter the data unit with an interface filter associated with the identified output interface; and forward the data unit via the identified output interface.

20. The computer-readable medium of claim 19, further comprising instructions that cause the processor to:

dynamically instantiate a logical interface between the input interface that received the data unit and the control unit;

associate the instantiated interface with a first forwarding table of the plurality of forwarding tables; and filter the data unit of the instantiated interface with a forwarding filter associated with the first forwarding table.

21. The computer-readable medium of claim 17, wherein each of the plurality of forwarding tables maintained by the control unit corresponds to one of a plurality of different customer virtual private networks (VPNs).

22. A network device comprising:

a plurality of input interfaces that receive data units from a network, wherein at least one of the input interfaces includes one or more interface filters that filter the data units received on the respective input interfaces;

a control unit coupled to each of the plurality of interfaces, wherein the control unit maintains a plurality of forwarding tables that each associate a plurality of network destinations with specific next hops in a network, and further wherein the control unit maintains a plurality of sets of forwarding filters, each of the sets of forwarding filters being associated with a different one of the forwarding tables, and each of the forwarding filters including at least one forwarding rule and an associated action; and wherein the control unit receives data its from the input interfaces, identifies one of the plurality of forwarding tables for each of the data units, applies to each of the data units the set of forwarding filters associated with the identified one of the plurality of forwarding tables, and forwards at least a Portion of the data units in accordance with the identified one of the plurality of forwarding tables.

* * * * *

UNITED STATES PATENT AND TRADEMARK OFFICE
CERTIFICATE OF CORRECTION

| | | |
|---|---|---|
| PATENT NO. | : 7,299,296 B1 | Page 1 of 1 |
| APPLICATION NO. | : 10/246244 | |
| DATED | : November 20, 2007 | |
| INVENTOR(S) | : Jeffrey Y. Lo and Scott Mackie | |

It is certified that error appears in the above-identified patent and that said Letters Patent is hereby corrected as shown below:

On Column 12, line 23 (claim 22), "Portion" should read --portion--.

Signed and Sealed this

Eleventh Day of November, 2008

JON W. DUDAS
*Director of the United States Patent and Trademark Office*